United States Patent [19]
Hayashi

[11] Patent Number: 5,790,497
[45] Date of Patent: Aug. 4, 1998

[54] DISK-CARTRIDGE EJECTING MECHANISM

[75] Inventor: Katsuhiko Hayashi, Nagano, Japan

[73] Assignee: Kabushiki Kaisha Sankyo Seiki Seisakusho, Nagano, Japan

[21] Appl. No.: 736,489

[22] Filed: Oct. 24, 1996

Related U.S. Application Data

[63] Continuation of Ser. No. 360,942, Dec. 21, 1994, abandoned.

[30] Foreign Application Priority Data

Dec. 21, 1993 [JP] Japan ..................... 5-321545

[51] Int. Cl.[6] ............... G11B 33/02; G11B 17/04
[52] U.S. Cl. ....................... 369/77.2; 360/99.06
[58] Field of Search ................. 369/77.2, 77.1, 369/75.2, 75.1; 360/99.02, 99.06, 96.05, 96.06

[56] References Cited

U.S. PATENT DOCUMENTS

| | | | |
|---|---|---|---|
| 4,989,106 | 1/1991 | Uehara | 360/99.02 |
| 5,025,339 | 6/1991 | Kanno et al. | 360/99.02 |
| 5,212,605 | 5/1993 | Lim et al. | 360/99.06 |
| 5,355,359 | 10/1994 | Lee | 369/77.2 |

FOREIGN PATENT DOCUMENTS

| | | | |
|---|---|---|---|
| 59-77666 | 5/1984 | Japan | 360/99.06 |
| 5182334 | 7/1993 | Japan | 360/99.06 |

*Primary Examiner*—Allen Cao
*Attorney, Agent, or Firm*—Sughrue, Mion, Zinn, Macpeak & Seas, PLLC

[57] ABSTRACT

An ejecting mechanism for a disk cartridge includes an eject lever having a proximal end disposed in a cartridge accommodating chamber, the eject lever extending diagonally toward a cartridge-inserting port of the accommodating chamber, urging device for imparting a swinging bias in a cartridge-ejecting direction, an input pinion meshing with a rack disposed slidably on the eject lever, a braking device for applying a brake to the eject lever when the eject lever is swung in a direction of pushing out the cartridge from the accommodating chamber, a one-way rotating clutch for transmitting the rotation of the input pinion to the braking device, and a guide groove formed in the accommodating chamber in a direction intersecting with the eject lever, a portion of the eject lever being slidably engaged in the guide groove via the rack, so as to cause the rack to slide in conjunction with the swinging motion of the eject lever.

15 Claims, 9 Drawing Sheets

DISK-CARTRIDGE EJECTING MECHANISM

This is a Continuation of application Ser. No. 08/360,942 filed Dec. 21, 1994, now abandoned.

BACKGROUND OF THE INVENTION

1. Field of the Invention

The present invention relates to an ejecting mechanism for a disk cartridge having a disk-shaped storage medium for recording optical information or magnetic information.

2. Related art

A disk-cartridge ejecting mechanism is provided with a braking means of a fluid type using oil or the like or of a mechanical type so as to slowly push out the disk cartridge in an ejecting direction.

Namely, the ejecting mechanism is provided with a lever for slowly pushing out the disk cartridge in the ejecting direction, and an input gear serving as a means for transmitting energy for acting on the braking means is provided at the rotational center of the lever.

Furthermore, a toothed portion formed on a base frame of the ejecting mechanism meshes with the input gear.

In the above-described ejecting mechanism, the toothed portion formed on the base frame is provided in such a manner as to project from the base frame, and not only the toothed portion but also the input gear and its supporting portion need to be provided projectingly in the same direction as that of the toothed portion.

Accordingly, since the toothed portion, the input gear, and its supporting portion project from the base frame, the ejecting mechanism becomes thick, with the result that a disk drive apparatus in which the ejecting mechanism is installed is prevented from being made compact.

In addition, with the above-described ejecting mechanism, the rotational angle of the input gear tends to be small, so that there has been a problem in that a sufficient braking force cannot be obtained.

To obtain a sufficient braking force, it is necessary to make the braking means large, which hampers the attempt to make the disk drive compact, as described above.

SUMMARY OF THE INVENTION

It is an object of the present invention to provide an ejecting mechanism capable of obtaining a sufficient braking force and of being made compact.

According to an aspect of the present invention, there is provided a disk-cartridge ejecting mechanism including an eject lever having a proximal end disposed swingably at an innermost-end corner portion of an accommodating chamber for accommodating a disk cartridge, said eject lever extending diagonally toward a cartridge-inserting port of said accommodating chamber, urging means for urging said eject lever to cause said eject lever to swing in a cartridge-ejecting direction, a rack disposed slidably on said eject lever, an input pinion disposed on said eject lever and meshing with said rack, braking means for applying a brake to said eject lever when said eject lever is swung in a direction of pushing out the disk cartridge from said accommodating chamber, a guide groove formed in said accommodating chamber in a direction intersecting with said eject lever, a portion of said eject lever being slidably engaged in said guide groove via said rack, so as to cause said rack to slide in conjunction with the swinging motion of said eject lever; and a one-way rotating clutch for transmitting the rotation of said input pinion to said braking means when said eject lever is swung in the direction of pushing out the disk cartridge from said accommodating chamber.

As described above, in accordance with the present invention, since the relevant components of the disk-cartridge ejecting mechanism are disposed in the lever, meshing is made stable. At the same time, since projections from the base frame are reduced, the disk-cartridge ejecting mechanism can be made thin. Accordingly, it is possible to make compact the disk drive apparatus in which the disk-cartridge ejecting mechanism is mounted.

BRIEF DESCRIPTION OF THE DRAWINGS

FIGS. 11 (a) to (c) are plan views illustrating the operation of the lock mechanism;

DETAILED DESCRIPTION OF THE PREFERRED EMBODIMENTS

Figure 1:
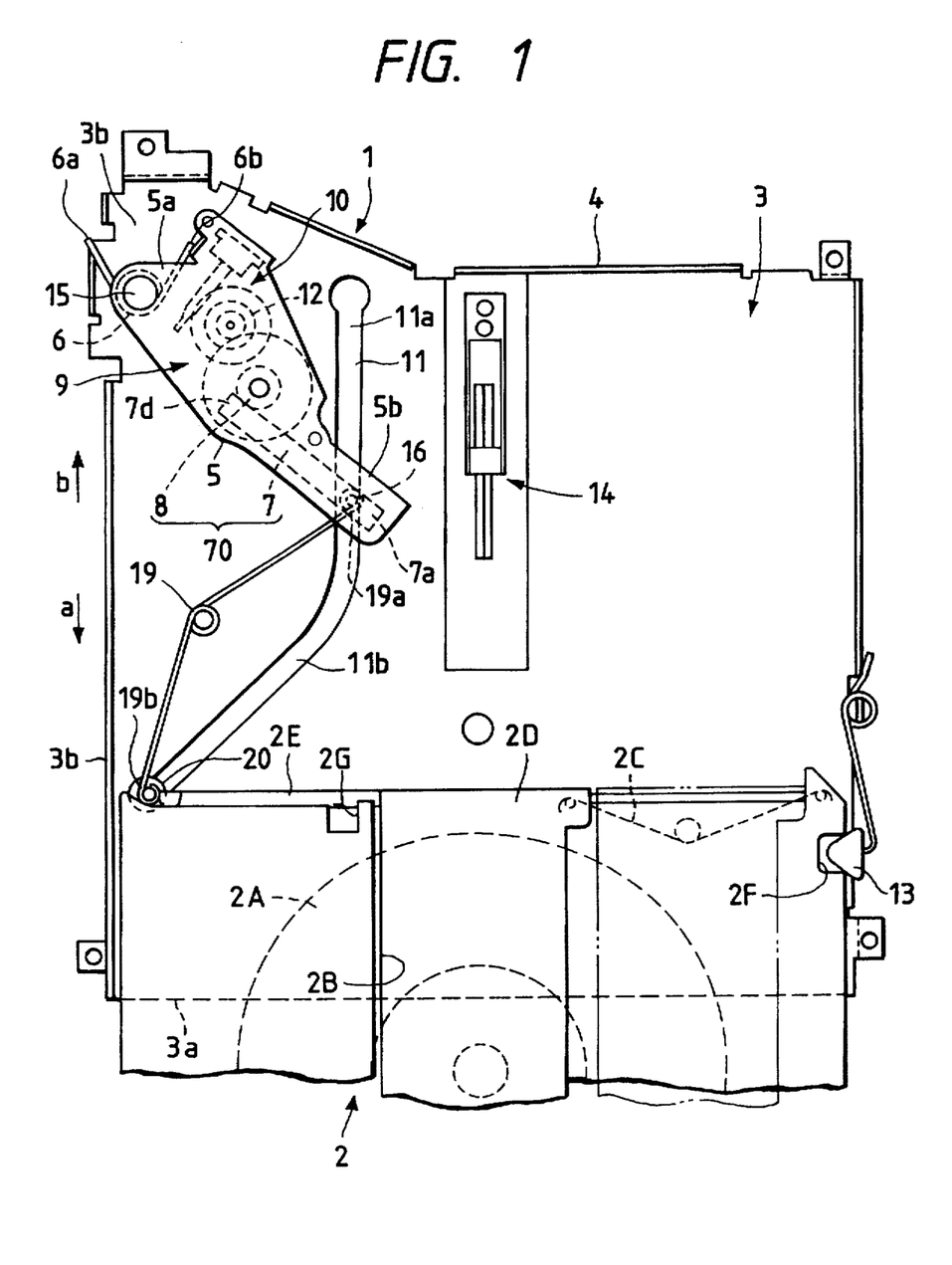
FIG. 1 is a plan view illustrating a schematic arrangement of a disk-cartridge ejecting mechanism showing an embodiment of the present invention.

In FIG. 1, reference numeral 1 denotes an ejecting mechanism of a disk cartridge 2 (hereafter referred to as the "cartridge 2").

The ejecting mechanism 1 is mainly comprised of an eject lever 5 (hereafter referred to as the "lever 5") swingably provided on a base frame 4 forming an accommodating chamber 3 for the cartridge 2; a torsion coil spring 6 serving as an urging means which is urged so as to swing the lever 5 in a cartridge-ejecting direction indicated by arrow a; a braking means 10 for braking the lever 5; a transmitting means 70 for transmitting the spring energy accumulated in the coil spring 6 to the braking means 10; a guide groove 11 serving as a guiding means for guiding the swinging motion of the lever 5 and the transmitting means 70; and a one-way rotating clutch 12.

The transmitting means 70 converts linear motion into rotary motion, and is constituted by, for instance, a rack 7 swingably provided on the lever 5 and an input pinion 8 provided on the lever 5 and meshing with the rack 7.

In addition, a speed increasing gear train 9 is arranged between the transmitting means 70 and the braking means 10 so as to increase the rotational speed of the transmitting means 70.

A storage medium 2A, which is formed in a disk shape for recording optical information or magnetic information, is rotatably supported in the cartridge 2. An opening portion 2B extending in the diametrical direction of the storage medium 2A is provided at a portion of the cartridge 2 which faces the storage medium 2A. The opening portion 2B is slidably supported by the cartridge 2, and is closed by a shutter 2D which is urged in such a manner as to slide in a closing direction by a torsion coil spring 2C provided in the cartridge 2.

An arm 2E extending along a side of the accommodating chamber 3 is formed at an upper left edge of the shutter 2D, and is adapted to move on the upper edge of the cartridge 2 as the shutter 2D slides.

An indented portion 2G for holding the shutter 2D in an open state is formed at the upper edge of the cartridge 2 located in a moving range of the arm 2E.

A recess 2F is formed on a side edge of the cartridge 2, and this recess 2F is engaged with a projection 13 which is supported on the base frame 4 and is urged in a direction in which it advances into the accommodating chamber 3, as shown in FIG. 1.

The accommodating chamber 3 is a space formed by bending peripheral portions of the base frame 4 formed of a thin metal plate, and a portion which is not bent is used as a cartridge inserting port 3a (hereafter referred to as the "inserting port 3a").

A reference numeral 14 represents a magnet for generating a bias magnetic field when the information is recorded or erased with respect to the storage medium 2A.

The lever 5 for pushing out the cartridge 2 in the ejecting direction has its proximal end 5a swingably supported by a shaft 15 at an innermost-end corner portion 3b of the accommodating chamber 3.

In addition, the lever 5 extends diagonally toward the inserting port 3a, as shown in FIG. 1.

The torsion coil spring 6 having one end 6a retained by the base frame 4 and another end retained by the lever 5 is wound around the shaft 15. The spring energy is accumulated in the torsion spring coil 6 when the lever 5 is swung in a direction toward the farther end of the accommodating chamber 3, as indicated by arrow b.

The rack 7, the input pinion 8, the speed increasing gear 9, and the braking means 10 are incorporated in the lever 5.

Figure 3:
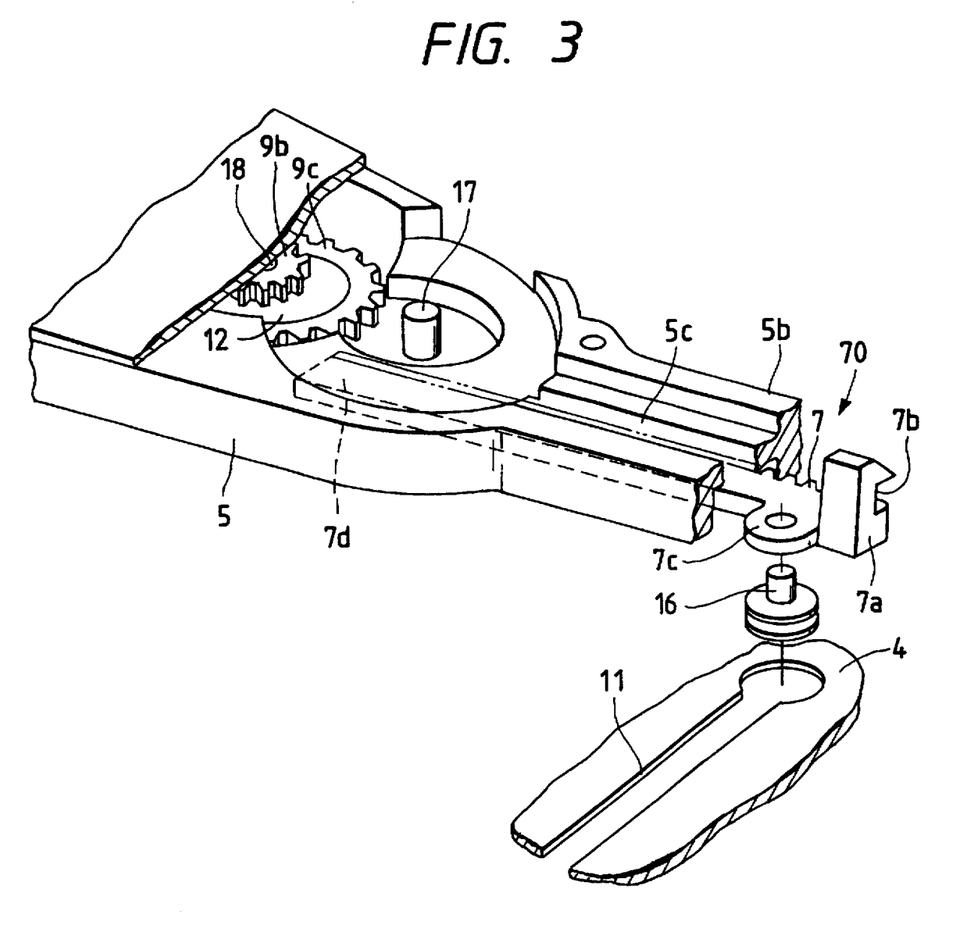
FIG. 3 is a partially enlarged perspective view of an eject lever.

As shown in FIG. 3, formed on one end 7a of the rack 7 are a recess 7b for engaging a protruding rail portion 5c formed on a projecting end 5b of the lever 5, as well as a supporting portion 7c for rotatably supporting a first slider 16 loosely fitted in the guide groove 11. Another end 7d of the rack 7 meshes with the input pinion 8.

Figure 2:
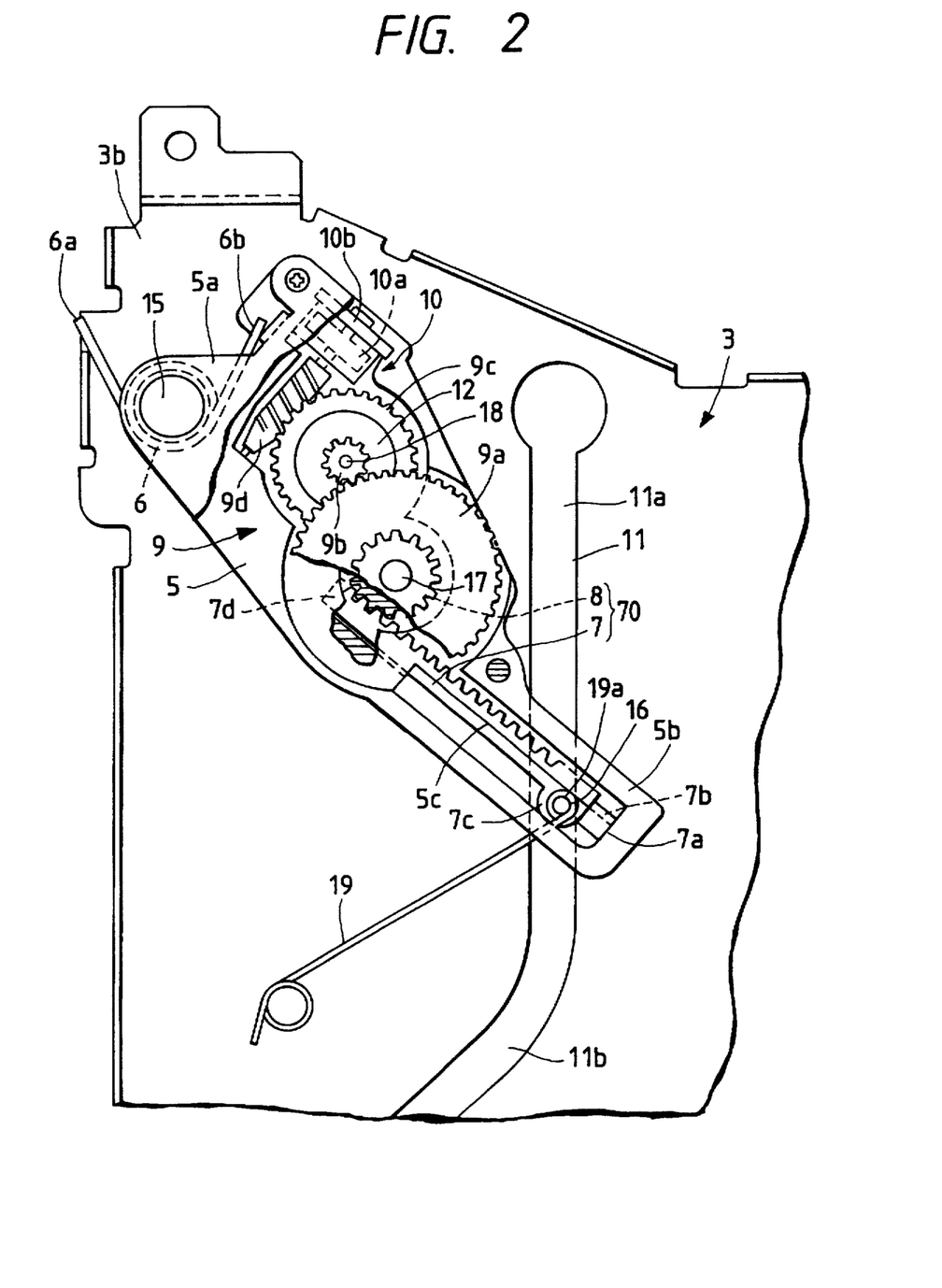
FIG. 2 is a partially fragmentary enlarged plan view of an ejecting mechanism which is an essential portion of the present invention.

The input pinion 8 is provided integrally with a large-diameter first gear 9a constituting a part of the speed increasing gear train 9, shown in FIG. 2, and is rotatably supported by a shaft 17 provided uprightly in the lever 5.

A small-diameter second gear 69b meshing with the first gear 9a and a worm wheel 9c meshing with a worm shaft 9d supported by the lever 5 are formed integrally via the one-way rotating clutch 12, and are rotatably supported in the lever 5 by a shaft 18.

Figure 6:
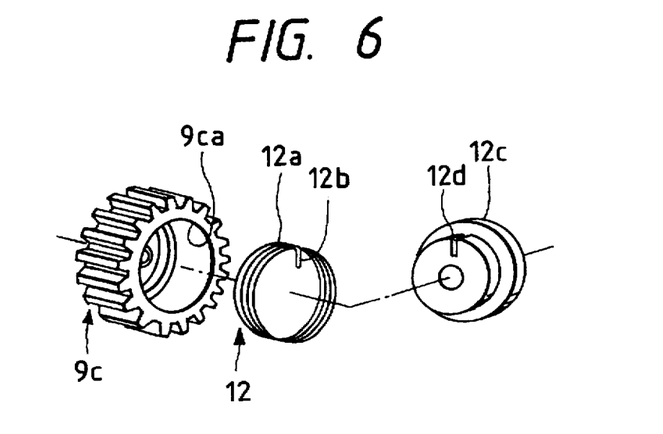
FIG. 6 is an exploded perspective view of a one-way rotating clutch using a torsion coil spring.

The one-way rotating clutch 12 is constituted by a torsion coil spring 12a, as shown in FIG. 6, and is adapted to transmit the rotation of the input pinion 8 to the braking means 10 only when the lever 5 is swung in the direction in which the cartridge 2 is pushed out from the accommodating chamber 3 (in the direction of arrow a, i.e., the ejecting direction of the cartridge 2).

As for the one-way rotating clutch 12a, as shown in FIG. 6, a second hollow cylindrical portion 12c is fitted with leeway to the inner peripheral surface of a first hollow cylindrical portion 9ca of the worm wheel 9c, and the torsion coil spring 12a is interposed between the worm wheel 9c and the second hollow cylindrical portion 12c in such a manner as to abut against the inner peripheral surface of the first hollow cylindrical portion 9ca.

An engaging portion 12d, which is notched in the axial direction, is provided in the second hollow cylindrical portion 12c, and a bent portion 12b of the torsion coil spring 12a is engaged in this engaging portion 12d.

The small-diameter second gear 9b constituting a part of the speed increasing gear train 9 is formed, though not shown, on the second hollow cylindrical portion 12c.

The one-way rotating clutch 12a is so arranged that the rotation of the second gear 9b is transmitted to the braking means 10 when the second gear 9b shown in FIG. 1 is rotated clockwise, i.e., when the lever 5 pushes out the cartridge 2 in the ejecting direction.

That is, when the second hollow cylindrical portion 12c (second gear 9b) is rotated clockwise, the bent portion 12b engaging in the engaging portion 12d is pushed, so that the torsion coil spring 12a is urged in a coil-expanding direction. This, in turn, causes the outer periphery of the torsion coil spring 12a to be pressed against the inner peripheral surface of the first hollow cylindrical portion 9ca of the worm wheel 9c, thereby allowing the rotation of the second hollow cylindrical portion 12c to be transmitted to the worm wheel 9c by its frictional force.

On the other hand, if the second hollow cylindrical portion 12c (second gear 9b) is rotated counterclockwise in the opposite direction to the above-described direction (i.e., is moved in the direction in which the cartridge 2 is inserted into the accommodating chamber 3), the torsion coil spring 12a is tightened, so that the rotation is not transmitted to the worm wheel 9c.

It should be noted that the one-way rotating clutch 12 is not confined to the torsion coil spring 12a, and an arrangement other than the same may be adopted.

Figure 7:
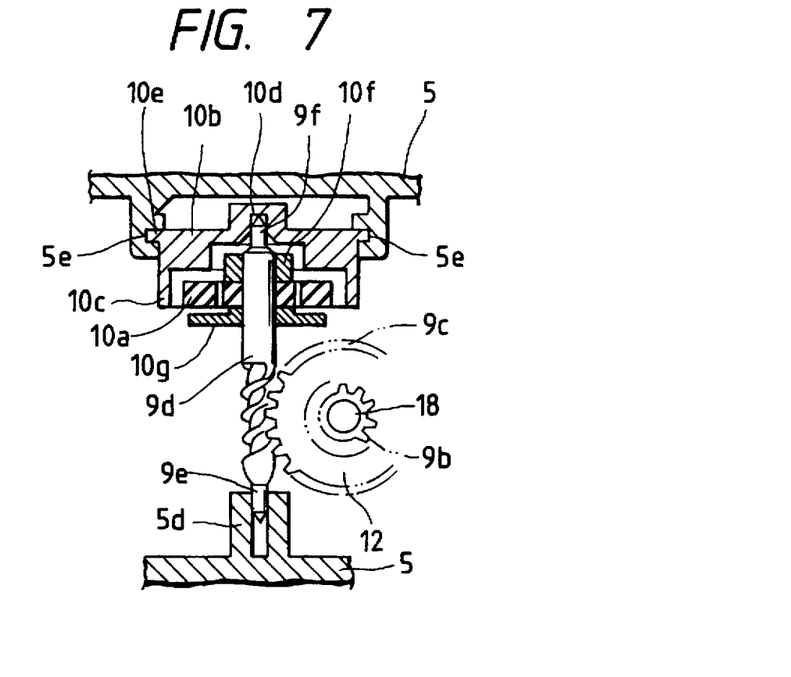
FIG. 7 is a vertical cross-sectional view illustrating a braking means.

The braking means 10 is, for instance, a friction-type damper, and is arranged as shown in FIGS. 2 and 7.

The worm shaft 9d has one end 9e rotatably supported by the bearing portion 5d formed on the lever 5 and another end 9f rotatably supported by a bearing portion 10d formed in a braking member 10b.

A frictional member 10a, which is formed of an elastic material such as rubber or other similar elastomeric material, is pressure-fitted over the worm shaft 9d at a position close to an axial end thereof. The axial position of the frictional member 10a is held by positioning members 10g, 10f which are pressure-fitted and fixed on the worm shaft 9d. The braking member 10b has a peripheral wall 10c formed at a position surrounding the frictional member 10a.

Figure 8:
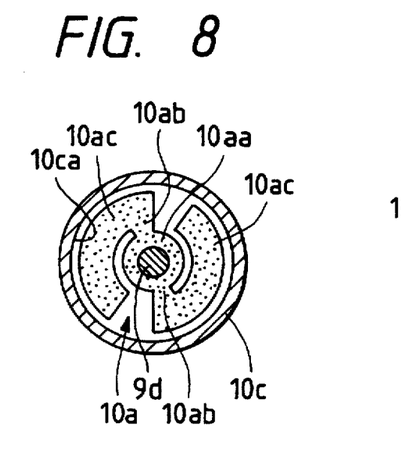
FIG. 8 is a horizontal cross-sectional view illustrating the positional relationship between a frictional member of the braking means and a peripheral wall of a braking member.

As shown in FIG. 8, the frictional member 10a is comprised of a boss 10aa pressure-fitted to the worm shaft 9d, a pair of arms 10ad extending radially from the boss 10aa, and a pair of weight portions 10ac each having one end connected to the arm 10ad and extending arcuately along the peripheral wall 10c.

As for the frictional member 10a, as the rotating speed of the worm shaft 9d becomes high, the weight portions 10ac of the frictional member 10a expand due to the elastic deformation of the arms 10ad caused by the centrifugal force, and their outer peripheral surfaces frictionally slide on the inner peripheral surface 10ca of the peripheral wall 10c.

When the weight portions 10ac frictionally slide on the inner peripheral surface 10ca of the peripheral wall 10c, the rotational speed of the worm shaft 9d is lowered, and a brake is applied to its rotation.

Figure 9:
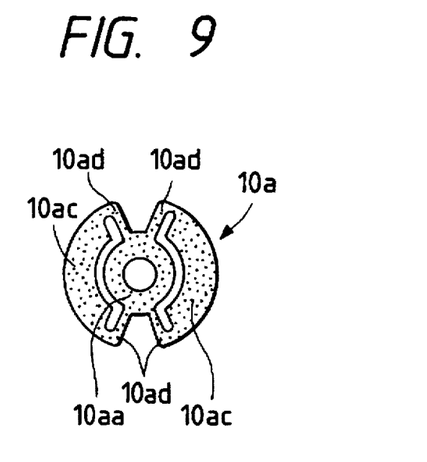
FIG. 9 is a plan view illustrating another example of the frictional member of the braking means.

Incidentally, both ends of each of the weight portions 10ac may be connected to the boss 10aa as the arms 10ad, as shown in FIG. 9.

The braking member 10b is supported at its flange 10e which is engaged in retaining grooves 5e formed in the case 5.

In addition, the braking means is not confined to the above-described friction-type, and an arrangement other than the one described above may be adopted.

The guide groove 11 serving as the guiding means is a groove which is formed in a chevron shape extending in a direction from the farther end of the accommodating chamber 3 toward the inserting port 3a, i.e., in the direction which intersects with the lever 5.

The guide groove 11 is comprised of a straight portion 11a located substantially on a line of extension of the indented portion 2G, as well as an inclined portion 11b extending toward the side portion 3b of the accommodating chamber 3 as it is directed toward the inserting port 3a. The guide groove 11 slidably guides the first slider 16 supported by the lever 5. That is, a part of the lever 5 is slidably engaged in the guide groove 11 indirectly via the rack 7.

The second slider 20 for opening the shutter 2D by engaging the arm 2E is slidably fitted loosely in the inclined portion 11b which is located on the inserting port 3a side.

A torsion spring 19 having one end 19a retained by the first slider 16 has another end 19b retained by the second slider 20, so as to urge the second slider 20 toward the inserting port 3 side.

Next, a description will be given of the operation of the ejecting mechanism arranged as described above.

In FIG. 1, when the cartridge 2 is inserted into the inserting port 3a, the projection 13 is engaged in the recess 2F, and the second slider 20 and the arm 2E are brought into contact with each other, allowing the cartridge 2 to be held in the vicinity of the inserting port 3a.

Figure 4:
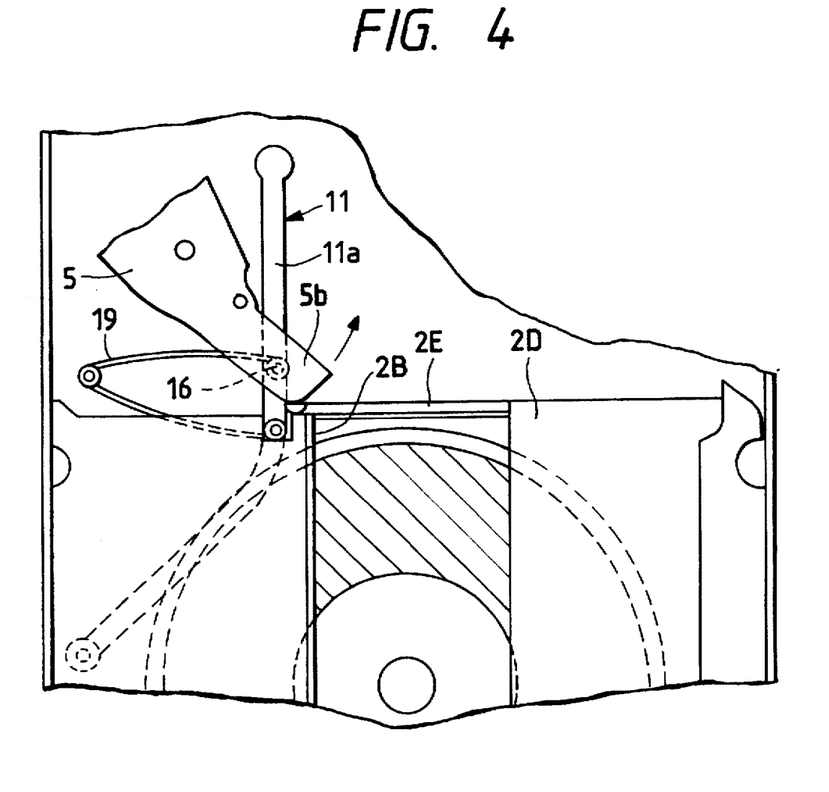
FIG. 4 is a plan view illustrating a state in which the disk cartridge is held by the ejecting mechanism.

As the cartridge 2 is further pressed and moved toward the interior of the accommodating chamber 3, the second slider 20 is guided from the side portion 3b of the accommodating chamber 3 toward the center thereof along the inclined portion 11b of the guide groove 11 in conjunction with the movement. Accordingly, the arm 2E is pressed in the rightward direction, thereby effecting an opening operation of the shutter 2D. At this time, when the second slider 20 is moved and falls into the indented portion 2G, the shutter 2D is held in the open state, and the cartridge 2 abuts against the projecting portion 5b of the lever 5 at this position (FIG. 4).

Next, when the cartridge 2 is pushed in, the lever 5 is swung about the shaft 15 in the direction of arrow b while accumulating spring energy in the torsion coil spring 6, and the first slider 16 is moved while being guided by the straight portion 11a.

Then, the rack 7 slides from the projecting portion 5b toward the proximal end 5a, so that the input pinion 8 is rotated clockwise, and the rotation is transmitted to the first gear 9a formed integrally therewith.

When the first gear 9a is rotated, the rotation tends to be transmitted to the second gear 9b. However, the rotation is not transmitted to the worm wheel 9c due to the action of the one-way rotating clutch 12, as described above, and the worm wheel 9c is set free, so that the transmission of the rotation to the braking means 10 is cut off. Accordingly, since the braking means 10 is not operated during the insertion of the cartridge 2, the inserting operation of the cartridge 2 becomes light and smooth.

Figure 5:
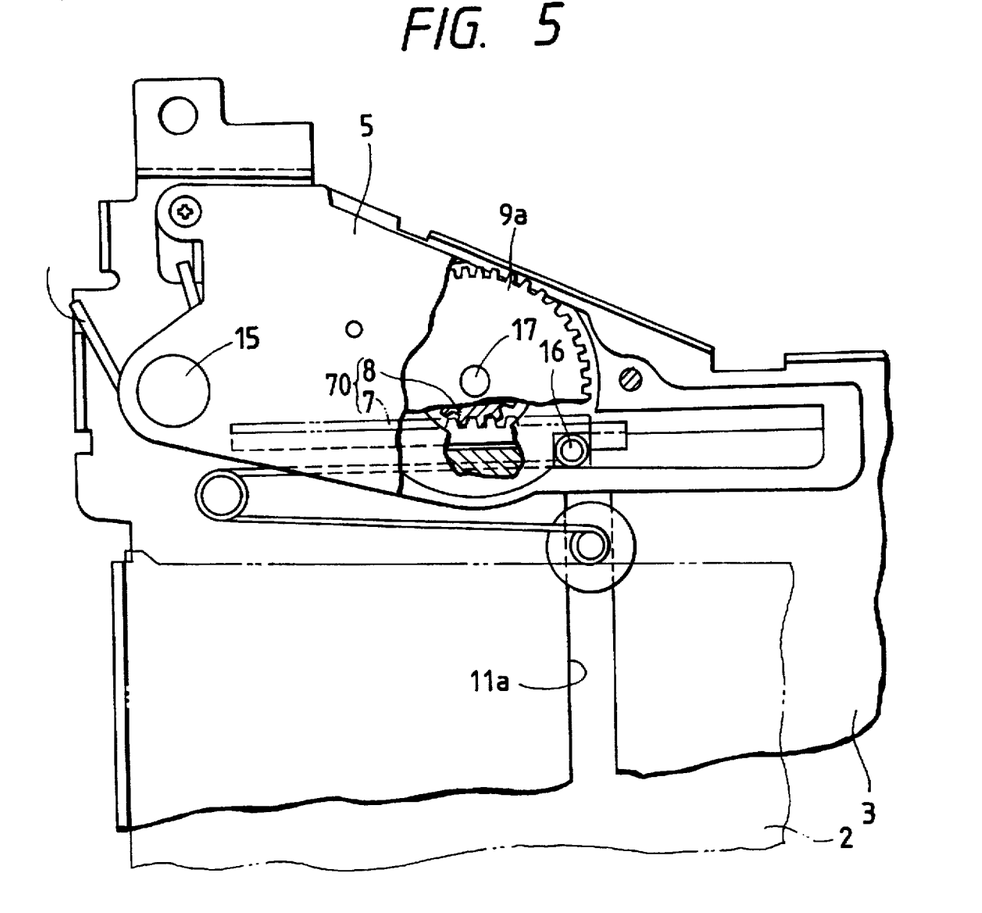
FIG. 5 is a partially fragmentary plan view illustrating a state in which the disk cartridge is accommodated by the ejecting mechanism.
Figure 10:
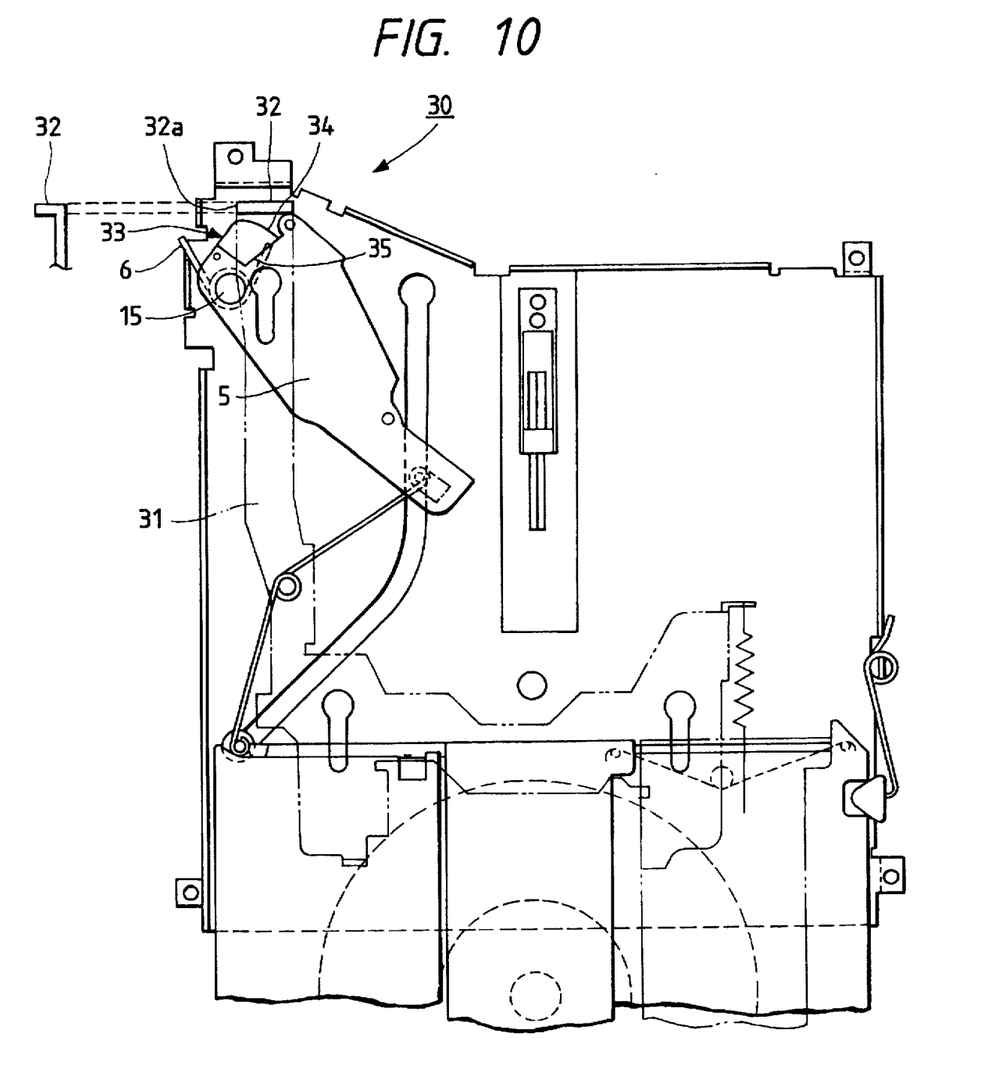
FIG. 10 is a plan view illustrating a lock mechanism.
Figure 11A:
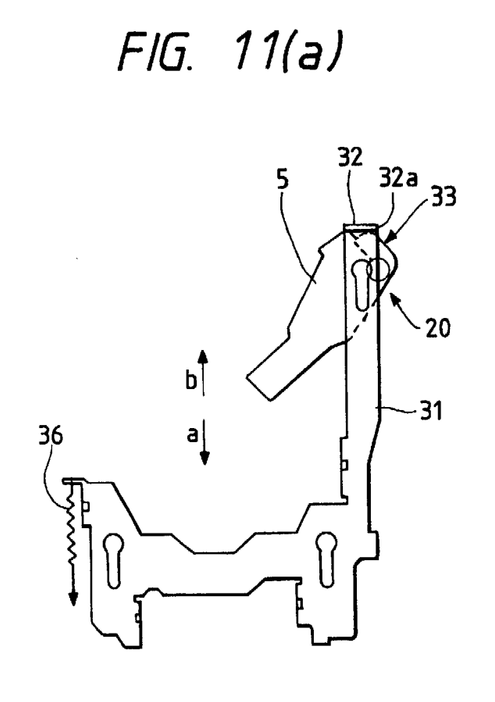
Figure 11B:
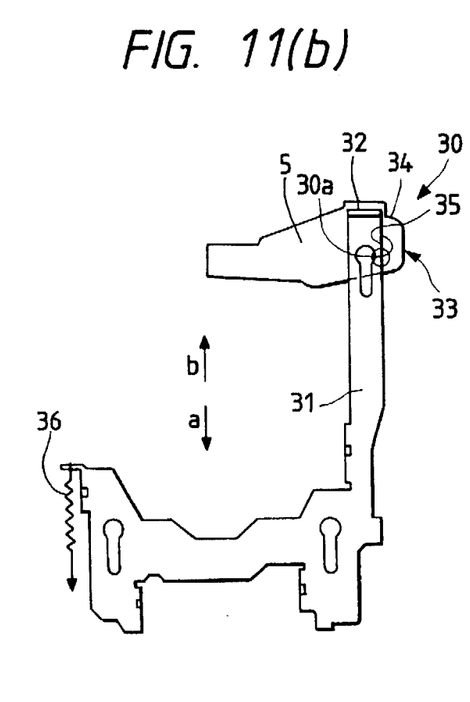
Figure 11C:
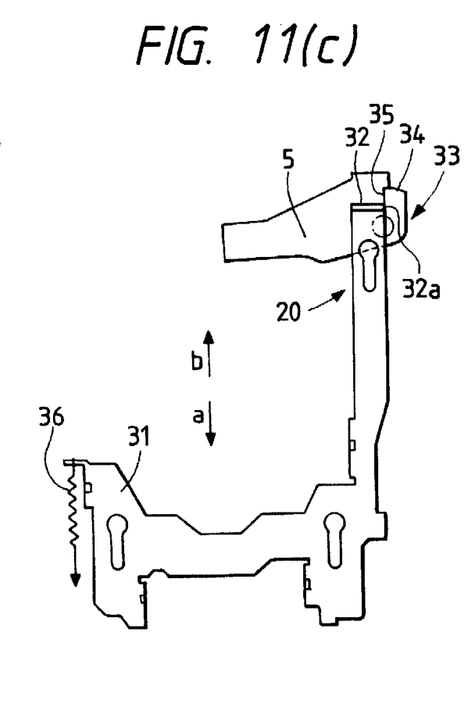

Then, when the lever 5, which is pressed and swung by the cartridge 2, moves to the innermost side of the accommodating chamber 3 shown in FIG. 5, the lever 5 is held at its position by a lock mechanism 30 such as the one shown in FIGS. 10 and 11.

Reference numeral 31 denotes a lock plate which is adapted to move in conjunction with the inserting or ejecting operation of the cartridge 2.

On the lock plate 31, a lock engaging portion 32 for engaging with a lock member, which will be described later, is formed in an L-shape, as shown in the drawings, and an end face of this lock engaging portion 32 is formed as a lock engaging surface 32a.

Meanwhile, the lock member 33 for engaging with and disengaging from the lock plate 31 is formed on the shaft 15 side of the lever 5.

A sliding surface 34, which slides on the lock engaging portion 32 when the cartridge 2 is moved in the inserting or ejecting direction, is formed in an arcuate shape on the lock member 33. In addition, an engaging surface 35 for engaging with the lock engaging surface 32a during locking is formed on the lock member 33.

The operation of the above-described lock mechanism 33 is shown in FIGS. 11 (a) to (c), in which FIG. 11 (a) shows a state immediately before the inserting operation of the cartridge (or immediately after the ejecting operation of the cartridge), i.e., a state in which the lock engaging portion 32 of the lock plate 31 and the sliding surface 34 of the lock member 33 abut against each other.

Incidentally, in the locked state, the lock engaging portion 32 and the sliding surface 34 of the lock member 33 may not abut against each other, as shown in FIG. 10.

FIG. 11 (b) is a diagram illustrating a state immediately before the operation of the lock mechanism 30 after the insertion of the cartridge 2. Namely, this is a state in which the sliding surface 34 of the lock member 33 is spaced apart from the state of abutment against the lock engaging portion 32 of the lock plate 31. Subsequently, the lock plate 31 is moved in the direction of arrow a by a spring 36.

FIG. 11 (c) illustrates a state in which the lock plate 31 is locked and is positioned in a predetermined position, in which the lock engaging surface 32a and the engaging surface 35 of the lock member 3 abut against each other, thereby locking the lever 5.

On the other hand, when the lock mechanism 30 is released, the operation is the opposite to the above-described operation, and the lever 5 is swung toward the inserting port 3a by the accumulated spring force of the torsion coil spring 6. Then, the first slider 16 moves in the guide groove 11 toward the insertion port 3 side, and causes the rack 7 to slide from the position shown in FIG. 5 in the rightward direction.

Then, since the input pinion 8 rotates counterclockwise, its rotation is transmitted to the worm shaft 9d by the one-way rotating clutch 12 interposed between the second gear 9b and the worm wheel 9c, as described above.

When the worm shaft 9d rotates, and its rotational speed becomes high, the frictional member 10a is expanded due to the centrifugal force, and frictionally slides on the inner peripheral surface of the inner wall 10c of the braking member 10b. The rotational speed of the worm shaft 9d is lowered by the frictional force at that time, thereby applying a brake to the rotation.

When the rotational speed of the worm shaft 9d becomes low, the weight portions 10ac are removed from the inner peripheral surface of the peripheral wall 10c, so that the rotational speed of the worm shaft 9d becomes high again. Thereafter, the rotational speed of the worm shaft 9d is maintained within a predetermined range by the repetition of the frictional sliding and spacing apart of the frictional member 10a and the peripheral wall 10c.

As a result, if the rotational speed of the worm shaft 9d is held at a predetermined value, the lever 5 cannot rotate at a high speed. That is, a brake is applied to the swinging motion of the lever 5 in the cartridge-ejecting direction (in the direction of arrow a), so that the cartridge 2 is discharged slowly from the accommodating chamber 3.

Thus, since the speed increasing gear train 9, the braking means 10, and the transmitting means 70 (the rack 7 and the pinion 8) are disposed in the lever 5, the meshing state can be made reliable without making them project with respect to the base frame 4.

It should be noted that although, in this embodiment, a mechanical damper for applying a brake to the swinging motion of the lever 5 by friction between the frictional member 10a and the braking member 10b is used as the braking means 10, the braking means 10 is not confined to this arrangement, and an arrangement other than the same may be adopted. For example, it is possible to use an oil damper shown in FIGS. 12 and 13.

Namely, it suffices if the friction-type damper 10 and the worm gear 9d shown in FIG. 2 are changed to an oil damper 100.

Figure 12:
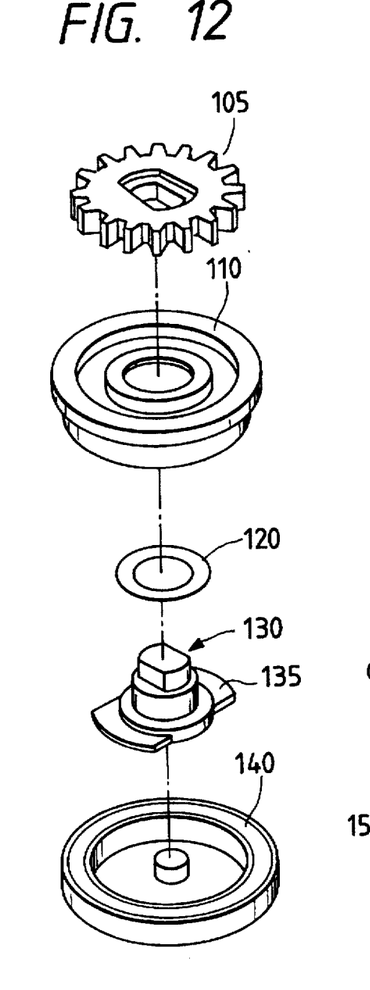
FIG. 12 is an exploded sectional view of an oil dumper as braking means.
Figure 13:
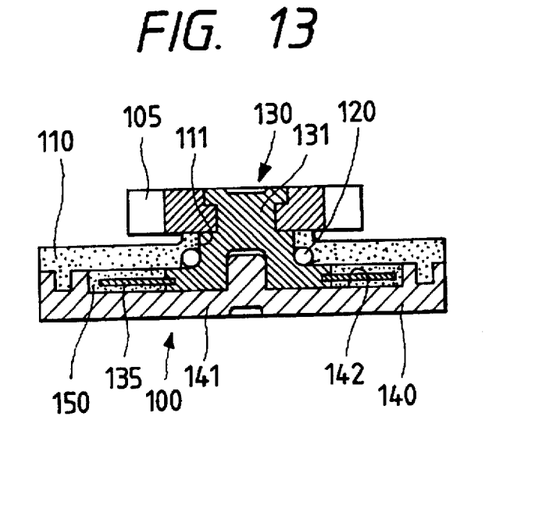
FIG. 13 is a vertical cross-sectional view illustrating the oil dumper as braking means.

The oil damper 100 is comprised of a hollow cylindrical case 140 with a bottom 141 and having an oil reservoir 142 in its interior; a cap 110 for covering an open upper surface of the oil reservoir 142 of the case 140, and having a circular opening 111 vertically penetrating a central portion thereof; a rotor portion 130 having a braking portion 135 rotating in oil 150 filled in the oil reservoir 142 of the case 140, and a shaft portion 131 projecting outward from the braking portion 135 through the opening 111 of the cap 110; and an input gear 105 fixed nonrotatably at a projecting end of the shaft portion 131 of the rotor portion 130. Incidentally, oil having a relatively high viscosity is used as the oil 150. In addition, numeral 120 in the drawings denote an O-ring.

Next, a description will be given of the operation of the ejecting mechanism using the oil damper 100.

In the same way as the friction-type damper 10, if the cartridge 2 shown in FIG. 1 is inserted into the inserting hole 3a and the cartridge 2 is pushed in, the lever 5 is swung about the shaft 15 in the direction of arrow b while accumulating spring energy in the torsion coil spring 6, and the first slider 16 is moved while being guided by the straight portion 11a.

Then, the rack 7 slides from the projecting portion 5b toward the proximal end 5a, so that the input pinion 8 is rotated clockwise, and the rotation is transmitted to the first gear 9a formed integrally therewith.

When the first gear 9a is rotated, the rotation tends to be transmitted to the second gear 9b. However, the rotation is not transmitted to the worm wheel 9c due to the action of the one-way rotating clutch 12, as described above, and the worm wheel 9c is set free, so that the transmission of the rotation to the oil damper 100 is cut off. Accordingly, since the oil damper 100 is not operated during the insertion of the cartridge 2, the inserting operation of the cartridge 2 becomes light and smooth.

Then, when the lever 5, which is pressed and swung by the cartridge 2, moves to the innermost side of the accommodating chamber 3 shown in FIG. 5, the lever 5 is held at its position by the lock mechanism 30 such as the one shown in FIG. 10.

On the other hand, when the lock mechanism 30 is released, since the input pinion 8 rotates counterclockwise, its rotation is transmitted to the input gear 105 by the one-way rotating clutch 12 interposed between the second gear 9b and the worm wheel 9c, as described above.

When the input gear 105 rotates and the braking portion 135 also rotates integrally therewith, and when the rotational speed becomes high, a braking force is generated by the shearing resistance of the oil 150 filled in the oil reservoir 142 of the case 140, so that the rotational speed of the input gear 105 is lowered, thereby applying a brake to the rotation.

When the rotational speed of the input gear 105 becomes low, the shearing resistance becomes low, so that the rotational speed of the input gear 105 becomes high again. Thereafter, the rotational speed of the input gear 105 is maintained within a predetermined range by the braking force based on the shearing resistance of the oil 150.

As a result, if the rotational speed of the input gear 105 is held at a predetermined value, the lever 5 cannot rotate at a high speed. That is, a brake is applied to the swinging motion of the lever 5 in the cartridge-ejecting direction (in the direction of arrow a), so that the cartridge 2 is discharged slowly from the accommodating chamber 3.

Figure 14:
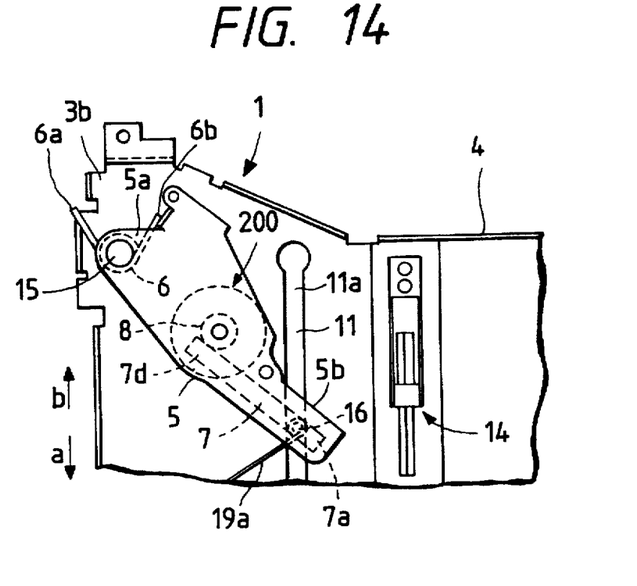
FIG. 14 is a plan view illustrating the oil dumper as braking means.

In addition, in the case of the oil damper, the one-way rotating clutch 12 may not be provided, as shown in FIG. 14, in which case an oil damper 200 is disposed directly on the input pinion 8. Incidentally, in this case, a brake is applied both when the cartridge 2 is inserted and when it is ejected.

As described above, in accordance with the present invention, since the relevant components of the disk-cartridge ejecting mechanism are disposed in the lever, meshing is made stable. At the same time, since projections from the base frame are reduced, the disk-cartridge ejecting mechanism can be made thin. Accordingly, it is possible to make compact the disk drive apparatus in which the disk-cartridge ejecting mechanism is mounted.

What is claimed is:

1. A disk-cartridge ejecting mechanism comprising:
   an eject lever having a proximal end disposed swingably at an innermost-end corner portion of an accommodating chamber for accommodating a disk cartridge, said eject lever extending diagonally toward a cartridge-inserting port of said accommodating chamber;
   urging means for urging said eject lever to cause said eject lever to swing in a cartridge-ejecting direction;
   a rack disposed slidably on said eject lever;
   an input pinion disposed on said eject lever and meshing with said rack;
   braking means for applying a brake to said eject lever when said eject lever is swung in a direction of pushing out the disk cartridge from said accommodating chamber;

a guide groove formed in said accommodating chamber in a direction intersecting with said eject lever, a portion of said eject lever being slidably engaged in said guide groove via said rack, so as to cause said rack to slide in conjunction with a swinging motion of said eject lever; and a one-way rotating clutch for transmitting the rotation of said input pinion to said braking means when said eject lever is swung in the direction of pushing out the disk cartridge from said accommodating chamber.

2. A disk-cartridge ejecting mechanism comprising:

an eject lever having a proximal end disposed swingably in an accommodating chamber for accommodating a disk cartridge;

urging means for urging said eject lever in such a manner as to cause said eject lever to swing in a disk-cartridge ejecting direction, said urging means disposed on a side of said eject lever adjacent said proximal end;

braking means for applying a brake to said eject lever when said eject lever is swung in a direction of pushing out the disk cartridge from said accommodating chamber in the ejecting direction; and transmitting means for transmitting to said braking means energy obtained when said eject lever is swung, wherein said braking means and said transmitting means are swung with said eject lever, and said transmitting means comprises a rack slidably supported on said eject lever and a gear train engaged with said rack.

3. A disk-cartridge ejecting mechanism as claimed in claim 2, further comprising:

guiding means for guiding a swinging motion of said eject lever and said transmitting means, said guiding means formed in said accommodating chamber.

4. A disk-cartridge ejecting mechanism as claimed in claim 2, wherein said braking means includes a friction-type damper.

5. A disk-cartridge ejecting mechanism as claimed in claim 2, further comprising a one-way clutch for transmitting the energy of said transmitting means to said braking means when said eject lever is swung in the direction of pushing out the disk cartridge from said accommodating chamber in the ejecting direction.

6. A disk-cartridge ejecting mechanism as claimed in claim 5, wherein said one-way rotating clutch includes a torsion coil spring.

7. A disk-cartridge ejecting mechanism as claimed in claim 2, wherein said braking means comprises an oil-type braking means.

8. A disk-cartridge ejecting mechanism as claimed in claim 7, further comprising:

a one-way rotating clutch for transmitting the energy of said transmitting means to said oil-type braking means only when said eject lever is swung in the direction of pushing out the disk cartridge from said accommodating chamber in the ejecting direction.

9. A disk-cartridge ejecting mechanism comprising:

an eject lever having a proximal end disposed swingably in an accommodating chamber for accommodating a disk cartridge;

urging means for urging said eject lever in such a manner as to cause said eject lever to swing in a disk-cartridge ejecting direction, said urging means disposed on a side of said eject lever adjacent said proximal end;

braking means for applying a brake to said eject lever when said eject lever is swung in a direction of pushing out the disk cartridge from said accommodating chamber in the ejecting direction;

transmitting means for transmitting to said braking means energy obtained when said eject lever is swung, wherein said braking means is swung with said eject lever; and a one-way clutch for transmitting the energy of said transmitting means to said braking means when said eject lever is swung in the direction of pushing out the disk cartridge from said accommodating chamber in the ejecting direction.

10. A disk-cartridge ejecting mechanism comprising:

an eject lever having a proximal end disposed swingably in an accommodating chamber for accommodating a disk cartridge;

urging means for urging said eject lever in such a manner as to cause said eject lever to swing in a disk-cartridge ejecting direction, said urging means disposed on a side of said eject lever adjacent said proximal end;

braking means for applying a brake to said eject lever when said eject lever is swung in a direction of pushing out the disk cartridge from said accommodating chamber in the ejecting direction; and transmitting means for transmitting to said braking means energy obtained when said eject lever is swung, wherein said braking means is swung with said eject lever, and wherein said braking means and said eject lever swing about a common fixed axis.

11. A disk-cartridge ejecting mechanism as recited in claim 10, wherein said braking means is uniformly supported by said eject lever and accommodated within said eject lever.

12. A disk-cartridge ejecting mechanism as claimed in claim 10, wherein said transmitting means is swung with said eject lever.

13. A disk-cartridge ejecting mechanism as claimed in claim 10, further comprising a one-way clutch for transmitting the energy of said transmitting means to said braking means when said eject lever is swung in the direction of pushing out the disk cartridge from said accommodating chamber in the ejecting direction.

14. A disk-cartridge ejecting mechanism as claimed in claim 10, wherein said transmitting means comprises a rack slidably supported on said eject lever and a gear train engaged with said rack.

15. A disk-cartridge ejecting mechanism as claimed in claim 10, wherein said braking means comprises an oil-type braking means.

* * * * *